United States Patent
Denietolis, Jr.

[11] Patent Number: 6,033,297
[45] Date of Patent: Mar. 7, 2000

[54] ASSEMBLY AND METHOD FOR DECAPITATING LABORATORY ANIMALS

[76] Inventor: Anthony F. Denietolis, Jr., 79 Plymouth Rd., Bellingham, Mass. 02019

[21] Appl. No.: 09/231,757

[22] Filed: Jan. 15, 1999

[51] Int. Cl.[7] .................................................. A22B 3/00
[52] U.S. Cl. ............................................................. 452/64
[58] Field of Search ........................................ 452/64, 63

[56] References Cited

U.S. PATENT DOCUMENTS

| | | | |
|---|---|---|---|
| 1,389,784 | 9/1921 | Rece | 452/64 |
| 2,417,890 | 3/1947 | Staufenbiel | 452/64 |
| 2,466,489 | 4/1949 | Silfen | 452/64 |
| 2,964,784 | 12/1960 | Kesselring | 452/64 |
| 3,203,036 | 8/1965 | Allison | 452/64 |
| 4,120,075 | 10/1978 | Rypstat | 452/64 |

FOREIGN PATENT DOCUMENTS

| | | | |
|---|---|---|---|
| 523002 | 4/1931 | Germany | 452/64 |
| 1664288 | 7/1991 | Russian Federation | 452/64 |

*Primary Examiner*—Willis Little
*Attorney, Agent, or Firm*—Pandiscio & Pandiscio

[57] ABSTRACT

A laboratory animal decapitator assembly includes a base plate and a frame fixed thereto. A first platen is fixed to the frame and is provided with a first notch in an edge thereof. A second platen is slidably movable in the frame between a first position substantially removed from the first platen and a second position alongside the first platen. The second platen is provided with a second notch in an edge thereof, the second notch being substantially opposed to the first notch when the second platen is in the first position, such that the first and second notches cooperatively define an aperture. The second notch is provided with a sharp edge. An actuating lever is connected to the assembly and is operable to cause movement of the second platen between the first and second positions. A safety latch is mounted on the lever to prevent movement of the lever and, upon manipulation thereof by an operator, to permit movement of the lever, and thereby movement of the second platen from the first position to the second position.

16 Claims, 3 Drawing Sheets

ASSEMBLY AND METHOD FOR DECAPITATING LABORATORY ANIMALS

FIELD OF THE INVENTION

This invention relates to the humane disposal of laboratory animals, such as mice, and is directed more particularly to an assembly and method for decapitating such animals.

BACKGROUND OF THE INVENTION

It is known to provide guillotine-like devices for beheading mice and other small laboratory animals which may have been rendered disabled and/or toxic and must be disposed of.

Of concern is the fact that on occasion the blade is activated while an operator's hand is in a blocking position, resulting in injury, such as loss of one or more fingers, and the like.

Accordingly, there is a need for a decapitation assembly having a safety facility requiring conscious action on the part of the operator to place the blade in condition for use.

There is further a need for a method for decapitating laboratory animals, which method is safe for the operator of the decapitating assembly.

OBJECTS OF THE INVENTION

An object of the present invention is to provide a laboratory animal decapitator assembly including a safety latch which must be manipulated by an operator before a decapitating blade is actuated.

A further object of the present invention is to provide a method for decapitating laboratory animals with reduced danger of injury to an operator.

SUMMARY OF THE INVENTION

These and other objects of the present invention are addressed by the provision and use of a novel laboratory animal decapitator assembly comprising a base plate and a frame fixed to the base plate and extending therefrom. A first platen is fixed to the frame and is provided with a first notch in an edge thereof. A second platen is slidably movable in the frame between a first position substantially removed from the first platen and a second position alongside the first platen, adjacent thereto, and parallel therewith. The second platen is provided with a second notch in an edge thereof, the second notch being substantially opposed to the first notch when the second platen is in the first position, such that the first and second notches cooperatively define an aperture. The second notch is provided with a sharp edge. An actuating lever is connected to the assembly and is operable to cause movement of the second platen between the first and second positions. A safety latch is mounted on the lever and is operative to prevent movement of the lever, and is operative, upon manipulation thereof by an operator, to permit movement of the lever, and thereby movement of the second platen from the first position to the second position.

The objects of the present invention are further addressed by the provision and use of a method for decapitating a laboratory animal, the method including the step of providing a decapitator assembly comprising a base plate, a frame fixed to the base plate and extending therefrom, a first platen fixed to the frame, the first platen having a notch in an edge thereof, a second platen slidably movable in the frame between a first position substantially removed from the first platen and a second position alongside the first platen, adjacent thereto, and parallel therewith, the second platen having a second notch in an edge thereof. The second notch is substantially opposed to the first notch when the second platen is in the first position, such that the first and said second notches cooperatively define an aperture. The second notch is provided with a sharp edge. An actuating lever is connected to the assembly and is pivotally operable to cause movement of the second platen between the first and second positions. A safety latch is mounted on the lever and is operative to prevent movement of the lever, and operative, upon manipulation thereof by an operator, to permit movement of the lever, and thereby movement of the second platen from the first position to the second position. The method includes the further steps of moving the lever to move the second platen to the first position and to permit the safety latch to move to a locking position, positioning the animal such that the neck of the animal is in the aperture, and holding the animal in such position, grasping a proximal end of the lever, extending a finger to engage the safety latch, pulling the safety latch with the extended finger to release the lever for movement, and moving the lever so as to move the second platen into the second position.

BRIEF DESCRIPTION OF THE DRAWINGS

These and other objects and features of the present invention will be more fully disclosed or rendered obvious by the following detailed description of the preferred embodiments of the invention, which are to be considered together with the accompanying drawings wherein like numbers refer to like parts, and further wherein.

DETAILED DESCRIPTION OF THE INVENTION

Figure 1:
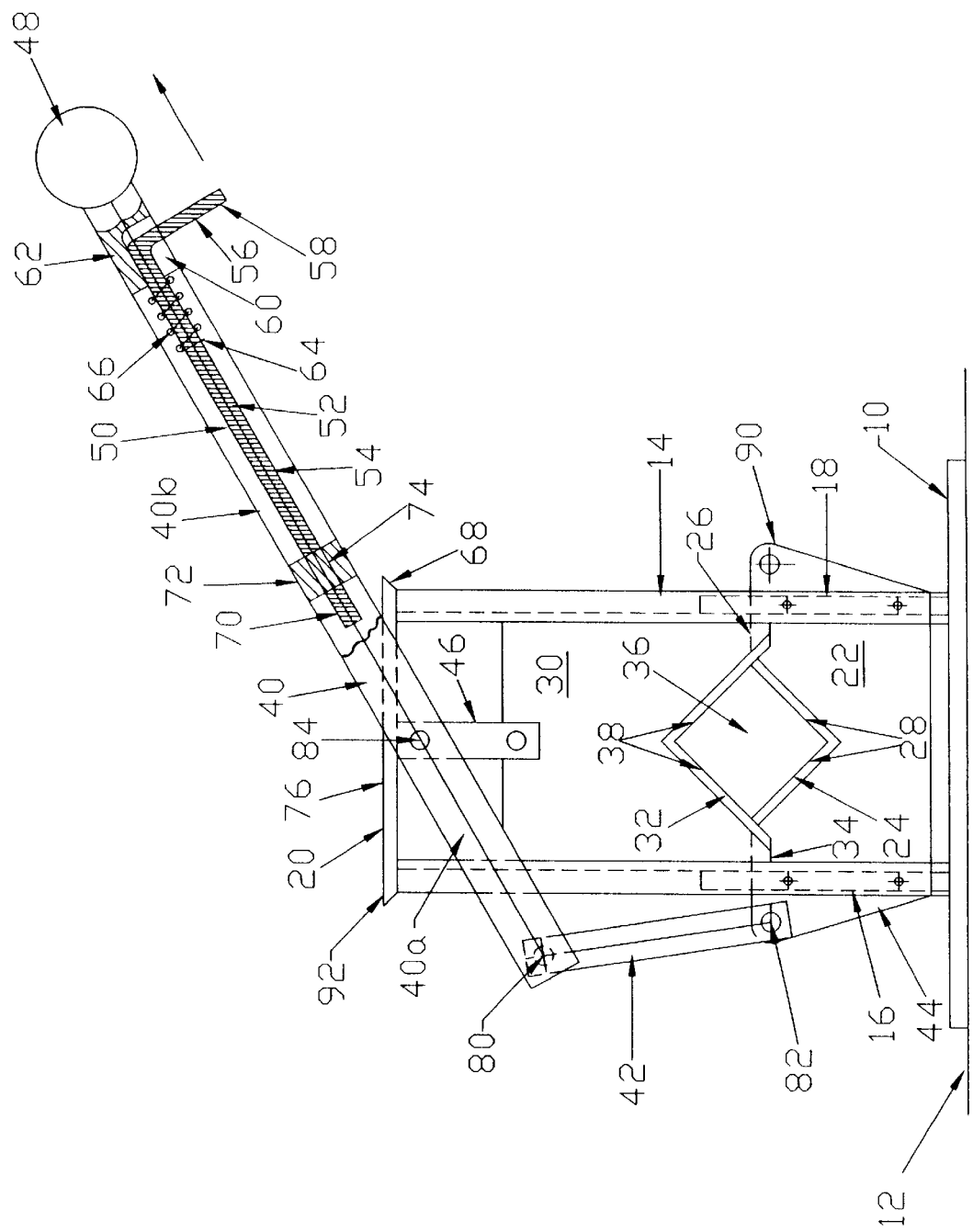
FIG. 1 is a front elevational view, in part broken away and in part in section, showing an illustrative embodiment of assembly for decapitating laboratory animals.

Referring to FIG. 1, it will be seen that the illustrative assembly includes a base plate 10 which may be mounted on any desired supporting surface 12, as by screws, or the like (not shown). A frame 14 is fixed to base plate 10 and extends therefrom. In a preferred embodiment, frame 14 includes first and second posts 16, 18 upstanding from base plate 10 and interconnected by a top bar 20.

A first platen 22 is fixed to posts 16, 18 and is provided with a first notch 24 in a platen edge 26 most removed from base plate 10. The first notch 24 may be provided with a sharp edge 28.

Figure 2:
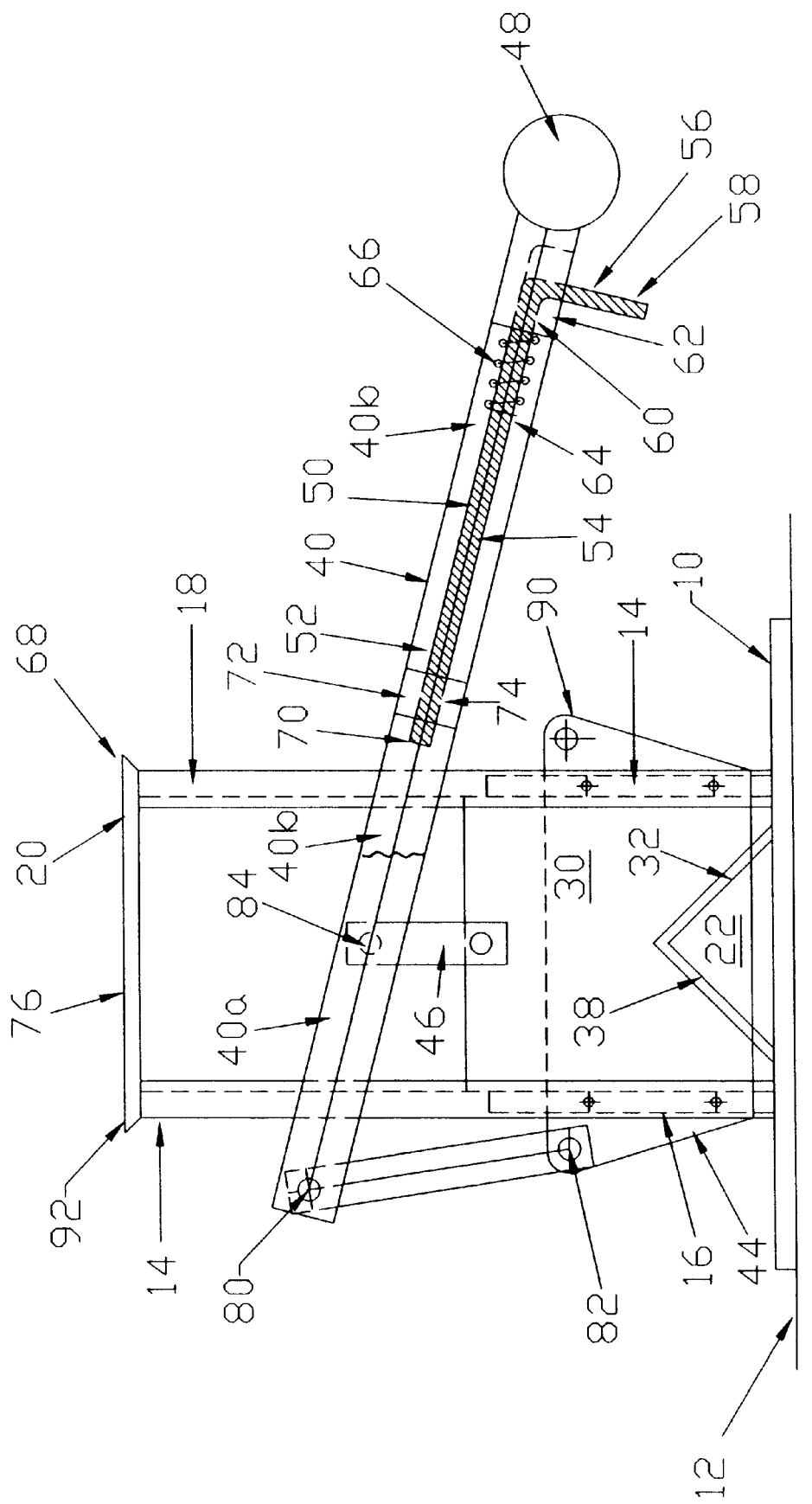
FIG. 2 is similar to FIG. 1, but illustrates the assembly in a different operational position.

A second platen 30 is slidably movable in opposed grooves 31, 33 (FIG. 3) in posts 16, 18, respectively. The second platen 30 is movable between a first position (FIG. 1) wherein the second platen 30 is substantially removed from the first platen 22, and a second position (FIG. 2) wherein second platen 30 is alongside first platen 22, adjacent thereto, and parallel therewith. The second platen 30 is provided with a second notch 32 on an edge 34. The second notch 32 is substantially opposed to first notch 24 when second platen 30 is in the first position (FIG. 1), such that the first and second notches 24, 32 cooperatively define an aperture 36. The second notch 32 is provided with a sharp edge 38.

Figure 3:
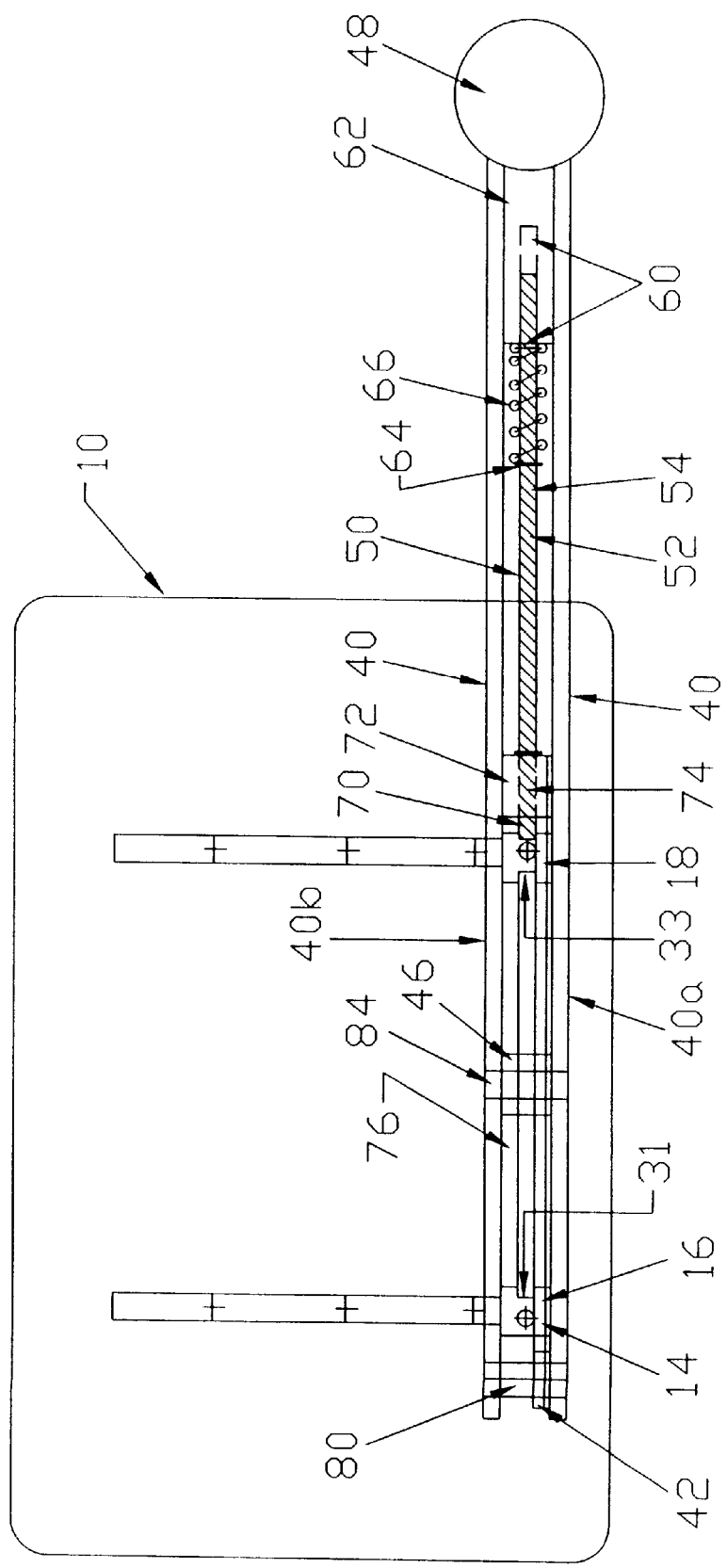
FIG. 3 is a top plan view of the assembly of FIG. 1.

An actuating lever 40 is pivotally connected to the assembly, as by pivotal connection to a link 42 which, in turn, may be pivotally connected to a wing portion 44 of first platen 22. The lever 40 is further connected, as by a link 46, to second platen 30. The link 46 is pivotally mounted at one end on lever 40, and is fixed at the other end on second platen 30. The actuating lever 40 preferably includes two parallel spaced apart plates 40a, 40b which move along front and rear surfaces, respectively, of posts 16, 18 and top bar 20 (FIG. 3). The lever 40 is operable to cause movement of second platen 30 between the aforementioned first and second positions shown in FIGS. 1 and 2, respectively. To facilitate handling of lever 40 by an operator, a proximal end of the lever 40 is provided with a knob 48, or other gripping means.

A safety latch 50 is mounted on lever 40 and comprises a generally L-shaped rod 52 having a first leg 54 extending lengthwise along lever 40 and a second leg 56 at a proximal end of rod 52, and extending transversely to leg 54, to provide a finger grip portion 58. The rod first leg 54 extends through an opening 60 in a block 62 extending widthwise between plates 40a, 40b. The rod first leg 54 is provided with a flange 64 fixed thereon. A coil spring 66 is disposed around rod first leg 54 and between flange 64 and block 62, to bias rod 52 leftwardly as shown in the drawings.

The frame top bar 20 is provided with an abutment 68 which is configured and positioned to be engaged by a distal end portion 70 of rod first leg 54, which is slidably retained by a support block 72 having a bore 74 therethrough.

In operation, an operator grasps the knob 48 and raises the lever 40 to the position shown in FIG. 1 to provide aperture 36. The animal to be decapitated (not shown) is then positioned by the operator such that the neck of the animal is disposed in the aperture. When the operator is satisfied that the animal is properly positioned and that the operator's hand holding the animal is safely positioned, the operator extends a finger around rod finger grip portion 58 and pulls rod 52 proximally to remove the latch 50 from position for engaging frame abutment 68. The grip portion 58 is proximate the lever knob 48 to permit one-handed simultaneous operation thereof by the operator.

The knob 48 is then moved quickly downwardly, toward base plate 10. The lever 40 pivots around a pivot pin 80 mounted in link 42 and the link 42 pivots around a pivot pin 82 mounted in first platen wing portion 44, to permit level 40 to descend. The link 46 pivots around a pivot pin 84 mounted in the lever 40, enabling the second platen 30 to move linearly in the grooves 31, 33 of frame posts 16, 18. In short order, the second platen sharp edge 38 engages the animal neck, cutting therethrough and forcing the neck against the first platen sharp edge 28.

The sharp edge 28 of the first platen 22 is in the rear plane of the first platen 22 and the sharp edge 38 of the second platen 30 is in the front plane of the second platen 30. In practice, it is preferred that the second platen front surface slide along the first platen rear surface. Thus, the sharp edges 28, 38 are substantially in the same plane and cooperatively effect a quick, clean cut through the animal neck.

The lever 40 is then raised. The abutment 68 is configured such that upon rising engagement of the rod end portion 70 therewith, the rod is moved axially and proximally against the bias of spring 66, to permit the latch 50 to pass the abutment 68, and snap onto a top surface 76 of the top bar 20. Upon release of the lever 40, the rod distal end portion 70 engagement with the top bar top surface 76 holds the lever 40 in place and ready for another cycle of operation.

In manufacture, the first platen may be of symmetrical configuration, as shown in the drawings, with a second wing portion 90 adapted to have the link 42 pivotally fixed thereto. Similarly, the frame top bar 20 may be of symmetrical configuration, with a second abutment 92 similar to abutment 68. Thus, if in a particular laboratory setting, it becomes beneficial to anchor the link 42 on the second wing portion 90 and to extend the lever 40 in an opposite direction, and to utilize the second abutment 92 as a safety stop means, such may be undertaken by moving pivot pin 82 and removing and resetting pivot pin 84.

There is thus provided an assembly and method for humanely destroying laboratory animals, such as mice, and which greatly reduces the safety hazards to operators charged with the disposal of such animals.

What is claimed is:

1. A laboratory animal decapitator assembly comprising:
    a base plate;
    a frame fixed to said base plate and extending therefrom;
    a first platen fixed to said frame, said first platen having a first notch in an edge thereof;
    a second platen slidably movable in said frame between a first position substantially removed from said first platen and a second position alongside said first platen, adjacent thereto, and parallel therewith, said second platen having a second notch in an edge thereof, said second notch being substantially opposed to said first notch when said second platen is in said first position, such that said first and second notches cooperatively define an aperture, said second notch having a sharp edge;
    an actuating lever connected to said assembly and operable to cause movement of said second platen between said first and second positions; and
    a safety latch mounted on said lever and operative to prevent movement of said lever, and operative, upon manipulation thereof by an operator, to permit movement of said lever and thereby movement of said second platen from said first position to said second position.

2. An assembly according to claim 1 wherein said safety latch comprises a rod spring-biased toward a position in which said rod engages said frame to prevent said lever from moving said second platen from said first position.

3. An assembly according to claim 2 wherein said rod is generally L-shaped and comprises a first leg extending lengthwise along said lever, and a second leg at a proximal end of said rod and transverse to said first leg and proximate a proximal end of said lever.

4. An assembly according to claim 2 wherein said frame is provided with an abutment adapted to be engaged by said rod.

5. An assembly according to claim 3 wherein the proximity of said rod second leg and said lever proximal end is such as to permit one-handed simultaneous operation thereof by the operator.

6. An assembly according to claim 4 wherein said abutment is disposed and configured to stop movement of said lever when said rod engages said abutment in a movement of said second platen toward said second position, and to permit continued movement of said lever when said rod engages said abutment in a movement of said second platen toward said first position.

7. An assembly according to claim 1 wherein said lever is connected to said second platen by a link which is fixed to said second platen and is pivotally mounted on said lever.

8. An assembly according to claim 7 wherein said lever is connected to said first platen.

9. An assembly according to claim 8 wherein said connection between said lever and said first platen comprises a link pivotally mounted at one end on said first platen and pivotally mounted at a second end on said lever.

10. An assembly according to claim 6, wherein said first platen is provided with a plurality of spaced mounting means, each adapted to have a link interconnecting said lever and said first platen mounted thereon, and said frame is provided with spaced first and second abutments each adapted for cooperation with said lever to stop movement of said lever toward said base plate.

11. An assembly according to claim 1 wherein said first notch is provided with a sharp edge.

12. An assembly according to claim 11 wherein said first notch sharp edge and said second notch sharp edge are in substantially the same plane.

13. An assembly according to claim 6 wherein said frame comprises first and second posts upstanding from said base plate, and a top bar interconnecting ends of said posts remote from said base plate, said abutment being disposed on said top bar.

14. An assembly according to claim 1 wherein said edge in which said first notch is disposed is an edge of said first platen most removed from said base plate.

15. A method for decapitating a laboratory animal, the method comprising the steps of:

providing a decapitator assembly comprising a base plate, a frame fixed to said base plate and extending therefrom, a first platen fixed to said frame, said first platen having a first notch in an edge thereof, a second platen slidably movable in said frame between a first position substantially removed from said first platen and a second position alongside said first platen, adjacent thereto, and parallel therewith, said second platen having a second notch in an edge thereof, said second notch being substantially opposed to said first notch when said second platen is in said first position, such that said first and second notches cooperatively define an aperture, said second notch having a sharp edge, an actuating lever connected to said assembly and operable to cause movement of said second platen between said first and second positions, and a safety latch mounted on said lever and operative to prevent movement of said lever, and operative, upon manipulation thereof by an operator, to permit movement of said lever and thereby movement of said second platen from said first position to said second position;

moving the lever to move the second platen to the first position and to permit the safety latch to move to a locking position;

positioning the animal such that the neck of the animal is in the aperture and holding the animal in such position;

grasping a proximal end of the lever;

extending a finger to engage the safety latch;

pulling the safety latch with the extended finger to release the lever for movement; and moving the lever so as to move the second platen into the second position.

16. A method according to claim 15 wherein said safety latch comprises a rod having a grip portion and spring-biased toward said locking position, and wherein engaging the safety latch comprises engaging the rod grip portion and wherein pulling the safety latch comprises pulling the rod grip portion against the spring bias.

* * * * *